United States Patent [19]

Rotolico et al.

[11] Patent Number: 4,964,568
[45] Date of Patent: Oct. 23, 1990

[54] SHROUDED THERMAL SPRAY GUN AND METHOD

[75] Inventor: Anthony J. Rotolico, Hauppauge; Janusz R. Weodarczy, Jackson Heights; both of N.Y.

[73] Assignee: The Perkin-Elmer Corporation, Norwalk, Conn.

[21] Appl. No.: 439,760

[22] Filed: Nov. 29, 1989

Related U.S. Application Data

[63] Continuation-in-part of Ser. No. 297,901, Jan. 17, 1989, abandoned.

[51] Int. Cl.$^5$ .................................................. B05B 1/24
[52] U.S. Cl. ........................................... 239/8; 219/76.16; 219/121.47; 219/121.51; 239/13; 239/84; 239/85; 239/290
[58] Field of Search ...................... 239/1, 8, 13, 79, 81, 239/83, 84, 85, 290, 424, 427, 427.3, 427.5; 219/76.16, 121.47, 121.5, 121.51, 121.53

[56] References Cited

U.S. PATENT DOCUMENTS

| | | |
|---|---|---|
| 2,317,173 | 2/1940 | Bleakley . |
| 2,514,036 | 5/1970 | Smith, Sr. et al. ............... 239/85 |
| 2,544,259 | 11/1944 | Duccini et al. . |
| 2,659,623 | 11/1953 | Wilson . |
| 2,794,677 | 6/1957 | Collardin et al. ............... 239/85 |
| 2,960,275 | 11/1960 | Wolf ................................. 239/85 |
| 3,148,818 | 7/1962 | Charlop . |
| 3,455,510 | 11/1966 | Rotolico . |
| 3,470,347 | 1/1968 | Jackson . |
| 3,530,892 | 3/1968 | Charlop . |
| 3,958,097 | 5/1976 | Fabel et al. ................. 219/76.16 |
| 4,121,083 | 10/1978 | Smyth . |
| 4,291,217 | 9/1981 | Braun ......................... 219/121.51 |
| 4,328,257 | 9/1987 | Muehlberger . |
| 4,416,421 | 11/1983 | Browning . |
| 4,632,309 | 12/1986 | Reimer ............................. 239/8 |
| 4,688,722 | 8/1987 | Dellassio et al. ............... 239/81 |
| 4,865,252 | 9/1989 | Rotolico et al. ................ 239/13 |
| 4,869,936 | 9/1989 | Moskowitz et al. ............ 239/290 |

FOREIGN PATENT DOCUMENTS

| | | |
|---|---|---|
| 0136978 | 4/1984 | European Pat. Off. . |
| 0142816 | 11/1984 | European Pat. Off. . |
| 1041056 | 10/1953 | France . |
| 1325474 | 3/1963 | France ............................. 239/290 |

Primary Examiner—Andres Kashnikow
Assistant Examiner—Michael J. Forman
Attorney, Agent, or Firm—H. S. Ingham; E. T. Grimes

[57] ABSTRACT

A powder or wire thermal spray gun, useful for spraying a low oxide coating of oxidizable material, comprises a nozzle member with a nozzle face, and a gas cap extending from the nozzle member and having an inwardly facing cylindrical wall defining a combustion chamber with an open end for propelling combustion products into the ambient atmosphere at supersonic velocity and an opposite end bounded by the nozzle face. An annular flow of a combustible mixture is injected from the nozzle member coaxially into the combustion chamber at a pressure therein sufficient to propel combustion products of the mixture from the open end at supersonic velocity. A first annular flow of inert gas is injected adjacent to the cylindrical wall radially outward of the annular flow of the combustible mixture. Heat fusible thermal spray material is fed from the nozzle member into the combustion chamber radially inward of the combustible mixture, whereby a supersonic spray stream containing the heat fusible material in finely divided form is propelled through the open end. A second annular flow of combustion gas is directed adjacently surrounding the spray stream forwardly from the open end. A third annular flow of inert gas is directed adjacently surrounding the second annular flow forwardly of the open end.

50 Claims, 5 Drawing Sheets

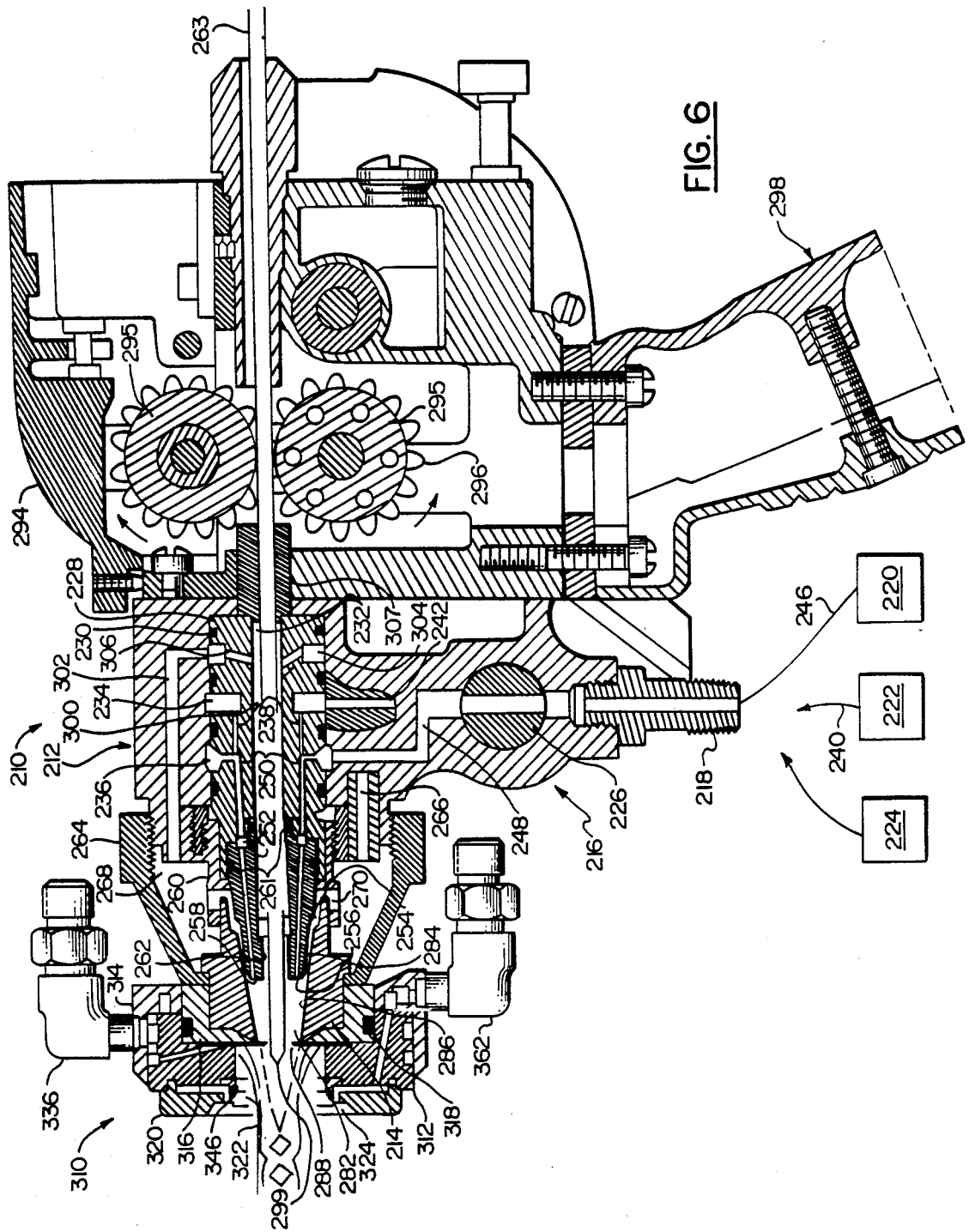

SHROUDED THERMAL SPRAY GUN AND METHOD

This application is a continuation-in-part of copending U.S. patent application Ser. No. 297,901 filed Jan. 17, 1989, now abandoned.

This invention relates to thermal spraying and particularly to a method and a gun for combustion thermal spraying powder or wire with a shroud.

BACKGROUND OF THE INVENTION

Thermal spraying, also known as flame spraying, involves the heat softening of a heat fusible material such as metal or ceramic, and propelling the softened material in particulate form against a surface which is to be coated. The heated particles strike the surface where they are quenched and bonded thereto. A thermal spray gun is used for the purpose of both heating and propelling the particles. In one type of thermal spray gun, such as described in U.S. Pat. No. 3,455,510 (Rotolico), the heat is provided by a combustion flame and the heat fusible material is supplied to the gun in powder form. Such powders are typically comprised of small particles, e.g., between 100 mesh U.S. Standard screen size (149 microns) and about 2 microns. The carrier gas, which entrains and transports the powder, can be one of the combustion gases or an inert gas such as nitrogen, or it can be simply compressed air.

The material alternatively may be fed into a heating zone in the form of a rod or wire such as described in U.S. Pat. No. 3,148,818 (Charlop). In the wire type thermal spray gun, the rod or wire of the material to be sprayed is fed into the heating zone formed by a flame of some type, such as a combustion flame, where it is melted or at least heat-softened and atomized, usually by blast gas, and thence propelled in finely divided form onto the surface to be coated.

A newer rocket type of powder spray gun is typified in U.S. Pat. No. 4,416,421 (Browning). This type of gun has an internal combustion chamber with a high pressure combustion effluent directed through an annular opening into the constricted throat of a long nozzle chamber Powder or wire is fed axially within the annular opening into the nozzle chamber to be heated and propelled by the combustion effluent.

Short-nozzle spray devices are disclosed for high velocity spraying in French Patent No. 1,041,056 and U.S. Pat. No. 2,317,173 (Bleakley). Powder is fed axially into a melting chamber within an annular flow of combustion gas. An annular flow of air or non oxidizing gas is injected coaxially outside of the combustion gas flow, along the wall of the chamber. The spray stream with the heated powder issues from the open end of the combustion chamber. A similar device is shown in U.S. Pat. No. 2,544,259 (Duccini et al) wherein the outer flow is taught to be a mixture of oxygen and combustion gas (butane).

Inert spraying to prevent or at least minimize oxidation of metallic or other oxidizable spray material has generally been effected with inert gas plasma spray guns in conjunction with shrouds or chambers to exclude air. U.S. Pat. No. 3,470,347 (Jackson) typifies shrouding of a plasma flame with an inert gas such as argon or helium, and otherwise spraying in open air. U.S. Pat. No. 4,121,083 (Smyth) discloses a flame shroud for a plasma spray gun and, optionally, an annular jet orifice means with cooling water or inert gas to provide an annular curtain effect around the shrouded plasma flame. However, in practice open air spraying with such shrouding of plasma flames requires large quantities of inert gas and reduces oxidation in coatings only to a limited extent.

Plasma spraying in low pressure inert atmosphere chambers, as taught in U.S. Pat. No. 4,328,257 (Muehlberger), can be quite successful in effecting metallic coatings that are dense and free of oxides. However, commercial users of such systems report extensive practical problems and associated costs such as leakage and loading and unloading parts for coating. Dust that adheres to all surfaces in the chamber is potentially flammable, detrimental to pumping equipment, and difficult to clean; down time is typically twice as long as operational time. The plasma spray stream is too wide for small and odd shaped parts used in turbine engines, particularly at the 40 cm spray distance required, and the spray stream is skewed because of the side injection of powder ("target point deviation"). There are reproductibility problems and 84 kw is used to obtain full melting, requiring extensive cooling. The odd shaped configurations for coating require robot-type handling equipment, a major challenge in a chamber.

Therefore objects of the present invention are to provide an improved thermal spray gun and method for spraying low-oxide coatings of oxidizable thermal spray material without the need for an inert atmosphere chamber, to provide an improved method and apparatus for combustion powder thermal spraying at very high velocity, to provide an improved method and apparatus for combustion wire thermal spraying particularly at high velocity, and to provide a method and apparatus for producing dense tenacious thermal sprayed coatings low in oxide at reasonable cost.

SUMMARY OF THE INVENTION

The foregoing and other objects of the present invention are achieved by a novel thermal spray gun useful for spraying a low-oxide coating of oxidizable material, comprising combustion gun means for generating a supersonic spray stream of combustion products and heat fusible material in finely divided form, sheath gas means for directing a first envelope flow of inert gas adjacently surrounding the spray stream, combustion envelope means for directing a second envelope flow of combustion gas adjacently surrounding the first envelope flow, and inert envelope means for directing a third envelope flow of inert gas adjacently surrounding the second envelope flow.

In a preferred embodiment the gun is a powder thermal spray gun comprising a nozzle member with a nozzle face, a first gas cap extending from the nozzle member and having an inwardly facing cylindrical wall defining a combustion chamber with an open end for propelling combustion products into the ambient atmosphere at supersonic velocity and an opposite end bounded by the nozzle face. Combustible gas means inject a first annular flow of a combustible mixture of a combustible gas and oxygen from the nozzle member coaxially into the combustion chamber at a pressure therein sufficient to propel combustion products of the mixture from the open end at supersonic velocity. Sheath gas means inject a first annular flow of inert gas adjacent to the cylindrical wall radially outward of the annular flow of the combustible mixture. Feeding means feed heat fusible powder from the nozzle member into the combustion chamber radially inward of the combustible mixture, whereby a supersonic spray stream containing the powder is propelled through the open end. Combustion envelope means direct a second annular flow of combustion gas adjacently surrounding the spray stream forwardly from the open end. Inert envelope means direct a third annular flow of inert gas adjacently surrounding the second annular flow forwardly of the open end.

The objectives are also achieved by a method for spraying a low-oxide coating of oxidizable material, comprising combustion gun means for generating a supersonic spray stream of combustion products and heat fusible material, sheath gas means for directing a first envelope flow of inert gas adjacently surrounding the spray stream, combustion envelope means for directing a second envelope flow of combustion gas adjacently surrounding the first envelope flow, inert envelope means for directing a third envelope flow of inert gas adjacently surrounding the second envelope flow, and directing the spray stream toward a substrate such as to produce a coating thereon.

In a preferred embodiment of the method a powder thermal spray gun is utilized including a nozzle member with a nozzle face, a first gas cap extending from the nozzle member and having an inwardly facing cylindrical wall defining a combustion chamber with an open end for propelling combustion products into the ambient atmosphere at supersonic velocity and an opposite end bounded by the nozzle face. The method comprises injecting a first annular flow of a combustible mixture of a combustible gas and oxygen from the nozzle member coaxially into the combustion chamber at a pressure therein sufficient to propel combustion products of the mixture from the open end at supersonic velocity, injecting a first annular flow of inert gas adjacent to the cylindrical wall radially outward of the annular flow of the combustible mixture, and feeding powder from the nozzle member into the combustion chamber radially inward of the combustible mixture, whereby a supersonic spray stream containing the heat fusible material in finely divided form is propelled through the open end. A second annular flow of combustion gas is directed adjacently surrounding the spray stream forwardly from the open end, a third annular flow of inert gas adjacently is directed surrounding the second annular flow forwardly of the open end, and the spray stream is directed toward a substrate such as to produce a coating thereon.

The foregoing and other objects of the present invention are also achieved by a novel wire thermal spray gun useful for spraying a low-oxide coating of oxidizable material, comprising a nozzle member with a nozzle face, a first gas cap extending from the nozzle member and having an inwardly facing cylindrical wall defining a combustion chamber with an open end for propelling combustion products into the ambient atmosphere and an opposite end bounded by the nozzle face. Combustible gas means inject a first annular flow of a combustible mixture of a combustible gas and oxygen from the nozzle member coaxially into the combustion chamber for combustion so as to propel combustion products of the mixture from the open end. Sheath gas means inject a first annular flow of inert gas adjacent to the cylindrical wall radially outward of the annular flow of the combustible mixture. Feeding means feed heat fusible thermal spray wire axially from the nozzle member into the combustion chamber radially inward of the combustible mixture to a point where a wire tip is formed, whereby a spray stream containing the heat fusible material in finely divided form is propelled away from the open end by the combustion products and the first annular flow. Combustion envelope means direct a second annular flow of combustion gas adjacently surrounding the spray stream forwardly from the open end. Inert envelope means direct a third annular flow of inert gas adjacently surrounding the second annular flow forwardly of the open end.

The objectives are also achieved by a method for spraying a low-oxide coating of oxidizable material, utilizing a combustion gun including a nozzle member with a nozzle face, and a first gas cap extending from the nozzle member and having an inwardly facing cylindrical wall defining a combustion chamber with an open end for propelling combustion products into the ambient atmosphere and an opposite end bounded by the nozzle face. The method comprises injecting a first annular flow of a combustible mixture of a combustible gas and oxygen from the nozzle member coaxially into the combustion chamber and combusting the mixture at a pressure therein sufficient to propel combustion products of the mixture from the open end, injecting a first annular flow of inert gas adjacent to the cylindrical wall radially outward of the annular flow of the combustible mixture, feeding a heat fusible thermal spray wire through the nozzle member into the combustion chamber radially inward of the combustible mixture, whereby a spray stream containing the heat fusible material in finely divided form is propelled from the wire. The method further comprises directing a second annular flow of combustion gas adjacently surrounding the spray stream forwardly from the open end, directing a third annular flow of inert gas adjacently surrounding the second annular flow forwardly of the open end, and directing the spray stream toward a substrate such as to produce a coating thereon. In a preferred embodiment the combustible mixture is injected at sufficient pressure to propel the spray stream at supersonic velocity.

BRIEF DESCRIPTION OF THE DRAWINGS

FIG. 6 is an elevation in vertical section of a thermal spray gun incorporating the present invention.

DETAILED DESCRIPTION OF THE INVENTION

Figure 1:
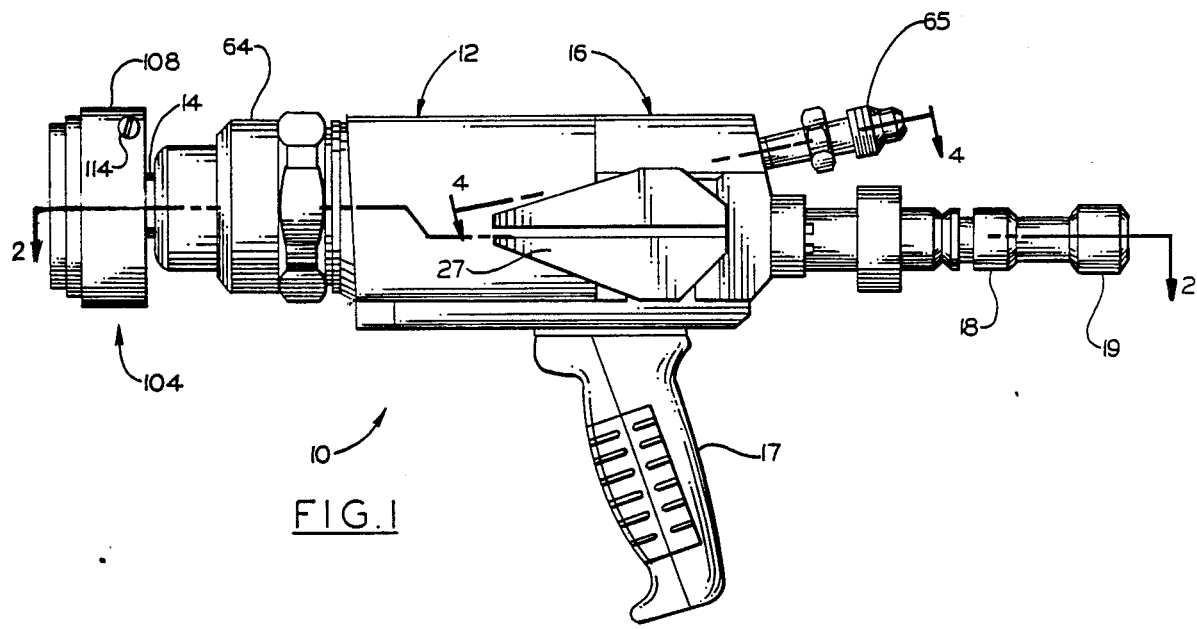
FIG. 1 is an elevation of a thermal spray gun used in the present invention.
Figure 2:
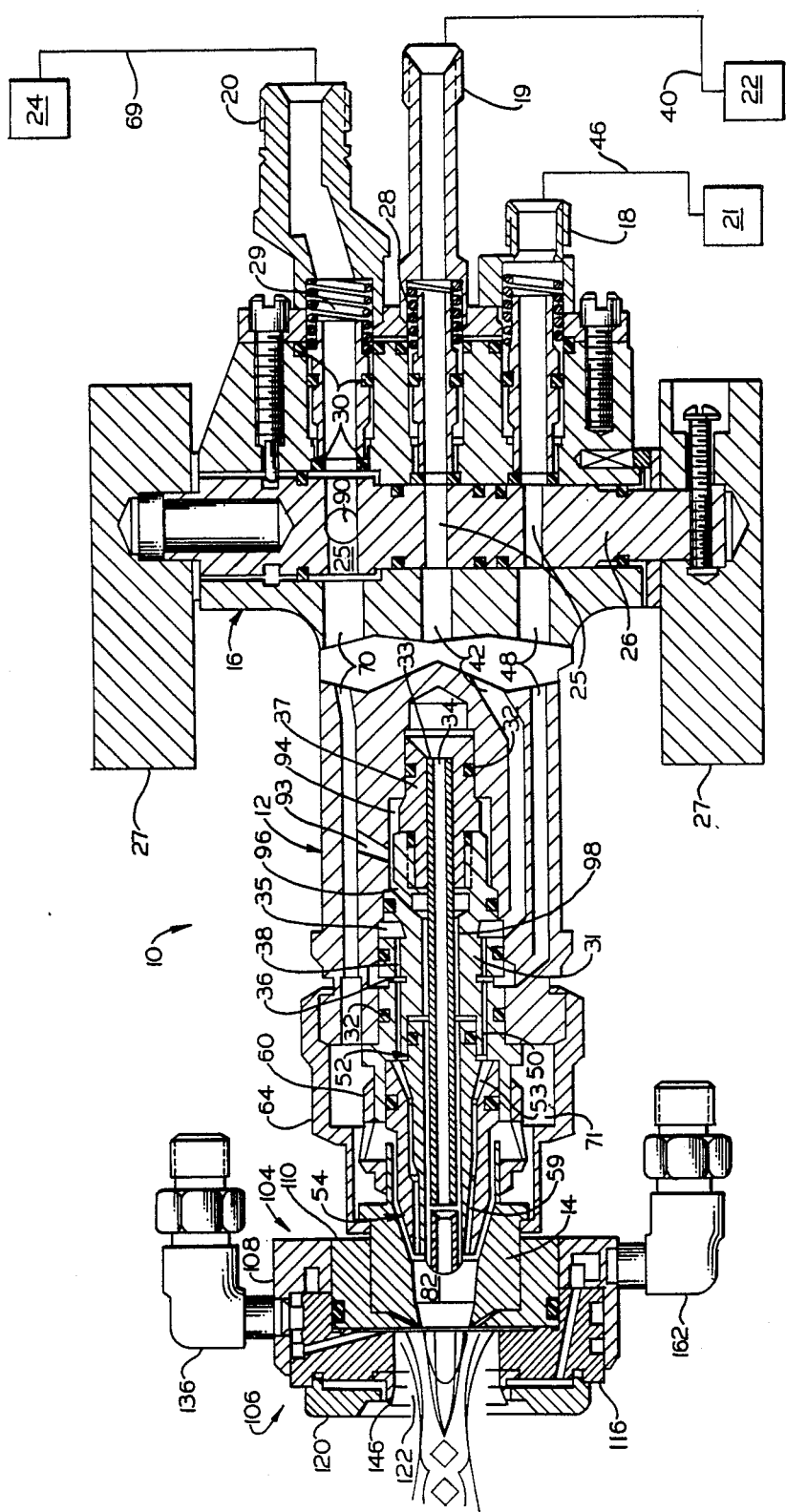
FIG. 2 is a section taken at 2—2 of FIG. 1.

For powder thermal spraying, an example of a preferred thermal spray apparatus utilizing the present invention is disclosed in copending patent application Ser. No. 193,030 filed May 11, 1988, now U.S. Pat. No. 4,865,252 assigned to the assignee of the present invention and detailed herein below. The apparatus is illustrated in FIG. 1, and FIG. 2 shows a horizontal section thereof. A thermal spray gun 10 has a gas head 12 with a gas cap 14 mounted thereon, a valve portion 16 for supplying fuel, oxygen and inert gas to the gas head, and a handle 17. The valve portion 16 has a hose connection 18 for a fuel gas, a hose connection 19 for oxygen and a hose connection 20 for inert gas. The three connections are connected respectively by hoses from a combustible gas source 21, oxygen source 22 and inert gas source 24. Orifices 25 in a cylindrical valve 26 control the flow of the respective gases from their connections into the gun. The valve and associated components are, for example, of the type taught in U.S. Pat. No. 3,530,892, and include a pair of valve levers 27, and sealing means for each gas flow section that include plungers 28, springs 29 and O-rings 30.

A cylindrical siphon plug 31 is fitted in a corresponding bore in gas head 12, and a plurality of O-rings 32 thereon maintain gastight seals. The siphon plug is provided with a central tube 33 having a central passage 34. The tube is mounted on a holder 37 threaded on the rear of the siphon plug and fitted axially into body 12. The siphon plug further has therein an annular groove 35 and a further annular groove 36 with a plurality of interconnecting passages 38 (two shown). With cylinder valve 26 in the open position as shown in FIG. 2, oxygen is passed by means of a hose 40 through its connection 19 and valve 26 into a passage 42 whence it flows into groove 35 and through passage 38. A similar arrangement is provided to pass fuel gas from source 21 and a hose 46 through connection 18, valve 26 and a passage 48 into groove 36, mix with the oxygen, and pass as a combustible mixture through passages 50 aligned with passages 38 into an annular groove 52. Annular groove 52 feeds the mixture into a plurality of passages 53 in the rear section of a nozzle member 54.

Figure 3:
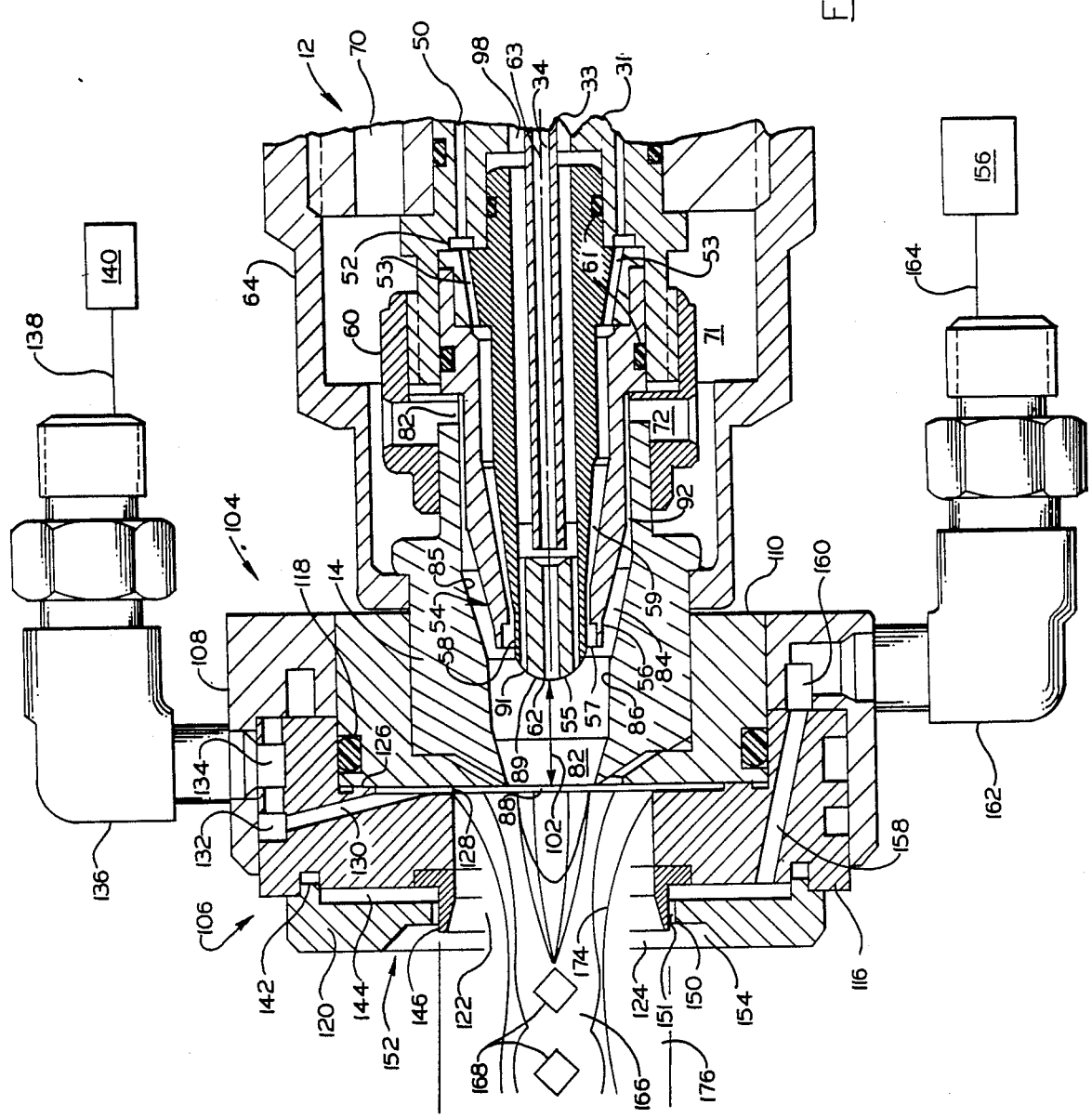
FIG. 3 is an enlargement of the forward end of the section of FIG. 2.

Referring to FIG. 3 for details, nozzle member 54 is conveniently constructed of a tubular inner portion 55 and a tubular outer portion 56. (As used herein and in the claims, "inner" denotes toward the axis and "outer" denotes away from the axis. Also "forward" and "forwardly" denote toward the open end of the gun; "rear", "rearward" and "rearwardly" denote the opposite.) Outer portion 56 defines an outer annular orifice means for injecting the annular flow of the combustible mixture into the combustion chamber. The orifice means preferably includes a forward annular opening 57 with a radially inward side bounded by an outer wall 58 of the inner portion. The orifice system leading to the annular opening from passages 53 may be a plurality of arcuately spaced orifices, but preferably is an annular orifice 59. The combustible mixture flowing from groove 52 thus passes through the orifice (or orifices) 59 to produce an annular flow which is ignited in annular opening 57. A nozzle nut 60 holds nozzle 54 and siphon plug 31 on gas head 12. Two further O-rings 61 are seated conventionally between nozzle 54 and siphon plug 31 for gas tight seals. The burner nozzle 54 extends into gas cap 14 which is held in place by means of a retainer ring 64 and extends forwardly from the nozzle.

Figure 4:
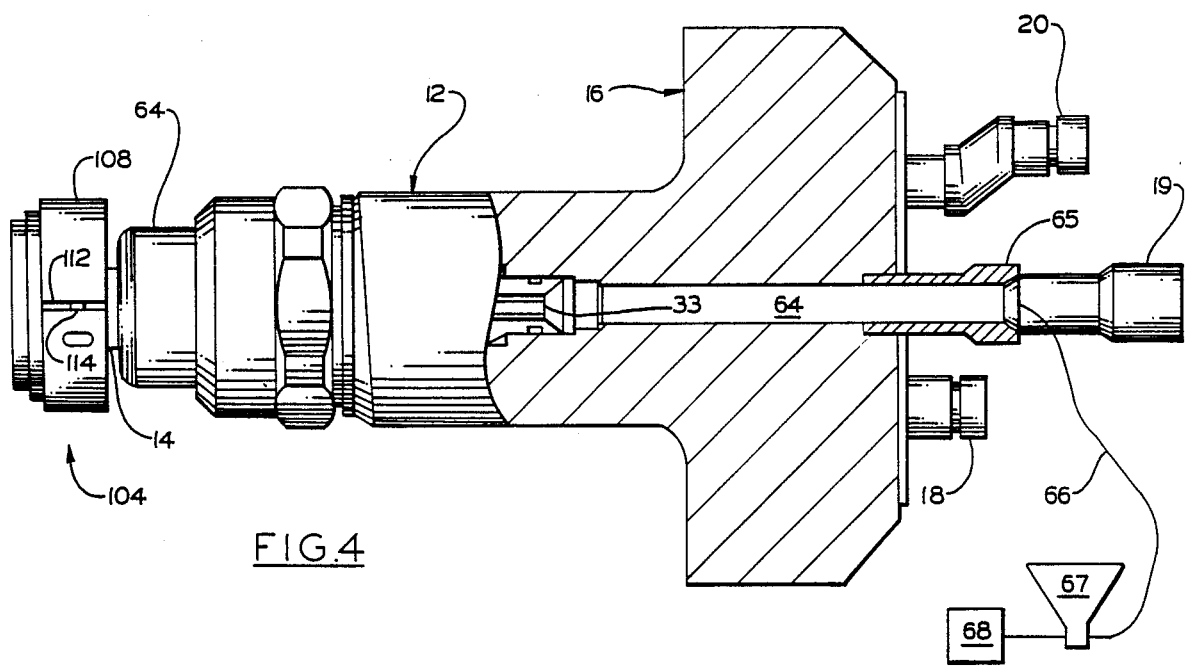
FIG. 4 is a section taken at 4—4 of FIG. 1 and a schematic of an associated powder feeding system.

Nozzle member 54 is also provided with an axial bore 62, for the powder in a carrier gas, extending forwardly from tube passage 34. Alternatively the powder may be injected through a small diameter ring of orifices (not shown) proximate the axis 63 of the gun. With reference to FIGS. 1 and 4, a diagonal passage 64 extends rearwardly from the rear of tube 33 to a powder connection 65. A carrier hose 66 and, therefore, central bore 62, is receptive of powder from a powder feeder 67 entrained in a carrier gas from a pressurized gas source 68 such as nitrogen or argon by way of feed hose 66. Powder feeder 67 is of the conventional or desired type but must be capable of delivering the carrier gas at high enough pressure to provide powder into the chamber 82 in gun 10, such as the feeder disclosed in copending patent application Ser. No. 260,625 filed Oct. 21, 1988 [Attorney Docket No. 3881] of the present assignee.

With reference back to FIGS. 2 and 3, inert gas is passed from source 24 and hose 69 through its connection 20, cylinder valve 26, and a passage 70 to a space 71 in the interior of retainer ring 64. Lateral openings 72 in nozzle nut 60 communicate space 71 with a cylindical combustion chamber 82 in gas cap 14 so that the gas may flow from space 71 through these lateral openings 72, thence as an outer sheath through an annular slot 84 between the outer surface of nozzle 54, and an inwardly facing cylindrical wall 85 which is a rearward extension of a wall 86 defining combustion chamber 82 into which slot 84 exits. The flow continues through chamber 82 as a first envelope flow mixing with the inner flows, and out of the open end 88 in gas cap 14. Chamber 82 is bounded at its opposite, rearward end by face 89 of nozzle 54.

Preferably combustion chamber 82 converges forwardly from the nozzle at an angle with the axis, most preferably between about 2° and 10°, e.g. 5°. Slot 84 as defined by wall 85 also converges forwardly at an angle with the axis, most preferably between about 12° and 16°, e.g. 14.5°. Slot 84 further should have sufficient length for the annular gas envelope flow to develop, e.g. comparable to chamber length 102, but at least greater than half of such length 102. In addition, the chamber should converge forwardly from nozzle 54 at a lesser angle than the slot, most preferably between about 8° and 12°, e.g. 10° less. This configuration provides a converging gas flow with respect to the chamber to minimize powder buildup on the chamber wall.

The inert gas flow rate may be controlled upstream of slot 84 such as by a rearward narrow orifice 92 or with a separate flow regulator. For example slot length is 8 mm, slot width is 0.38 mm on a 1.5 cm circle, and gas pressure to the gun (source 24) is 4.9 kg/cm$^2$ (70 psi) to produce a total gas flow of 425 l/min with a pressure of 4.2 kg/cm$^2$ (60 psi) in chamber 82. Also, with valve 26 (FIG. 2) in a lighting position aligning bleeder holes as described in aforementioned U.S. Pat. No. 3,530,892, a gas hole 90 in valve 26 allows gas flow for lighting, and the above indicated angles and dimensions are important to allow such lighting without backfire. (Bleeder holes in valve 26 for oxygen and fuel for lighting, similar to air hole 90, are not shown.)

The inner portion 55 of nozzle member 54 has therein a plurality of parallel inner orifices 91 (e.g. 8-orifices 0.89 mm diameter) on a bolt circle (e.g. 2.57 mm diameter) which provide for an annular inner sheath flow of inert gas, about the central powder feed issuing from bore 62 of the nozzle This inner sheath of gas contributes significantly to reducing any tendency of buildup of powder material on wall 86. The sheath gas is conveniently tapped from passage 70, via a duct 93 (FIG. 2) to an annular groove 94 around the rear portion of siphon plug 31 and holder 37, with at least one orifice 96 into an annular space 98 adjacent tube 33. Preferably at least three such orifices 96 are equally spaced arcuately to provide sufficient gas and to minimize vortex flow which could detrimentally swirl the powder outwardly to wall 86 of chamber 82. The inner sheath gas flow should be between 1% and 10%, preferably about 2% and 5% of the outer sheath envelop flow rate, for example about 3%. The inner sheath may alternatively be regulated independently of the outer sheath gas, for better control.

The chances of powder buildup are even further minimized by having the inner portion 55 (FIG. 3) of the nozzle member protrude into chamber 82 forwardly of the outer portion 56 as depicted in FIGS. 2 and 3. Chamber length 102 may be defined as the shortest distance from nozzle face 89 to open end 88, i.e. from the forwardmost point on the nozzle to the open end. Preferably the forwardmost point on the inner portion protrudes forwardly from the outer portion 56 by a distance between about 10% and 40% of chamber length 102, e.g. 30%.

A preferred configuration for the inner portion is depicted in FIGS. 2 and 3. Referring to the outer wall 58 of inner portion 55 of the nozzle, which defines annular opening 57, such wall 58 should extend forwardly from the annular opening with a curvature inward toward the axis. Preferably the curvature is uniform. For example, as shown, the curvature is such as to define a generally hemispherical face 89 on inner portion 58. It is believed that the combustion flame is thereby drawn inwardly to maintain the flows away from chamber wall 86.

As an example of further details of a thermal spray gun incorporating the present invention, siphon plug 31 has 8 oxygen passages 38 of 1.51 mm each to allow sufficient oxygen flow, and 1.51 mm diameter passages 50 for the gas mixture. In this nozzle head central bore 62 is 3.6 mm diameter, and the open end 88 of the gas cap is 0.95 cm from the face of the nozzle (length 102). Thus the combustion chamber 82 that also entrains the powder is relatively short, and generally should be between about one and two times the diameter of open end 88.

According to the present invention, mounted on the gas cap and forwardly therefrom is a further gas cap assembly 104 for providing additional flows surrounding the spray stream and its first envelope flow. In the example of FIGS. 2 and 3 this assembly includes a second gas cap 106 and a clamping ring 108. For convenient construction the second gas cap is formed of four components retained and sealed together conventionally by brazing, screws, O-rings or the like (for clarity not shown). However the cap and the clamping ring more generally may have any practical construction and attachment to first gas cap 14 and/or the rest of the gun.

One of the components of the second gas cap is an adaptor ring 110 that slips over first gas cap 14 and effectively forms a portion of the first gas cap; thus alternatively ring 110 and cap 14 may be formed of one piece. In the present example ring 110 is held on cap 14 by clamping ring 108 which, with adaptor ring 110, may have a slit 112 (FIGS. 1 and 4) and contain a clamping screw 114. A cylindrical intermediate member 116 fits forwardly over adaptor ring 110 and is sealed thereto with an O-ring 118. A washer shaped forward member 120 is attached to the intermediate member.

The intermediate member and an insert 148 therein cooperate to form a central forward chamber 122 in the second gas cap.

Chamber 122 should have an inside diameter between about one and three times the diameter of open end 88 of the first gas cap, and between about one and two times the inner length of forward chamber 122. The forward chamber has a forwardly facing exit opening 124.

Intermediate member 116 is spaced from the adaptor ring 110 by means of a first flange 126, sufficiently to form a thin annular aperture 128, e.g. 0.4 mm thick. This aperture receives a combustion gas such as propane via a first passage 130 in the intermediate member, interconnected first and second outer grooves 132, 134, a first gas connector 136 mounted on clamping ring 108 and a hose 138 from a source 140 of pressurized combustion gas. Aperture 128 opens radially into chamber 122 adjacent open end 88.

Forward member 120 is similarly spaced from intermediate member 116 with a second connecting flange 142 to form a channeling groove 144. Annular insert 146 affixed forwardly within the intermediate member with a space provides an annular aperture 150 with a terminal 151 opening in the forward face 152 of the second air cap adjacent exit opening 124. Aperture 150 communicates with groove 144. Coaxial aperture 150 is, e.g., 0.3 mm thick. Preferably forward member 120 has a dished face 154 from which insert 146 protrudes slightly. Connecting groove 144 receives an inert gas such as nitrogen, argon or helium from a pressurized gas source 156 via a second passage 158 in the intermediate member, a third outer groove 160, a second gas connector 162 and a hose 164. It will be appreciated that the forward gas cap may be more integral with the gun body so that further channeling in the gun may displace gas connectors 136, 162 to the rear of the gun, or the gases to the second cap may be tapped from the flow to the first gas cap.

In operation a supply of each of the gases to combustion chamber 82 is provided at a sufficiently high pressure, e.g. at least two atmospheres (gauge) above ambient atmospheric, where it is ignited conventionally such as with a spark device, such that the flow stream of combusted gases will issue from the open end as a supersonic flow entraining the powder in a spray stream 116. The heat of the combustion melts or at least heat softens the powder material such as to deposit a coating onto a substrate. Shock diamonds 168 (FIGS. 3 and 5) should be observable. Because of the annular flow configuration, an expansion type of nozzle exit is not necessary to achieve the supersonic flow.

Figure 5:
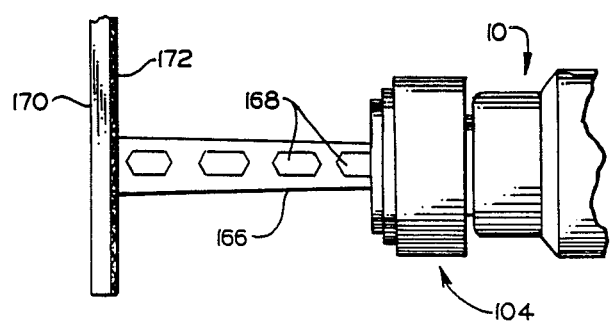
FIG. 5 is a schematic view of the gun of FIG. 1 producing a supersonic spray stream according to the present invention.

According to the present invention it is highly preferable that the primary fuel gas be propylene gas, or methylacetylenepropadiene gas ("MPS"). These gases allow a relatively high velocity spray stream and excellent coatings to be achieved without backfire. For example with a propylene or MPS pressure of about 7 kg/cm$^2$ (100 psi) gauge (above atmospheric pressure) and 71 l/min (150 scfh) flow to the gun, oxygen at 10 kg/cm$^2$ (140 psi) and 307 l/min (650 scfh), and an inner inert gas at 5.6 kg/cm$^2$ (80 psi) and 283 l/min (600 scfh) at least 8 shock diamonds are readily visible in the spray stream without powder flow. The position of the substrate 170 on which a coating 172 is sprayed is preferably about where the fourth or fifth full diamond would be as shown in FIG. 5, e.g. about 9 cm spray distance. Generally propylene or MPS should have a flow in the range of about 47 to 94 l/min (100 to 200 scfh). Hydrogen, if used, should flow the range of about 283 to 850 l/min (600 to 1800 scfh).

The gas flow means of annular aperture 128 provide for a combustion gas envelope 174 extending as a second annular combustion flow surrounding supersonic spray stream 166 forwardly from open end 88. Similarly the gas flow means of annular aperture 150 provide an inert gas envelope 176 extending as a second annular inert gas flow surrounding the second combustion flow 174 outside the inner supersonic stream, forwardly of the open end. Preferable flow rate for the combustion gas envelope is between about 38 and 94 l/min (80 and 200 scfh), e.g. 66 l/min (140 scfh), and for the inert gas envelope is between about 94 and 472 l/min (200 and 1000 scfh) e.g. 354 l/min (750 scfh). The outer inert envelope generally shields the spray stream, and the inner, combustion gas envelope gets oxygen from the air that penetrates the outer envelope.

The forward gas cap of the present invention also may be adapted to other supersonic thermal spray guns such as those of aforementioned U.S. Pat. No. 4,416,421.

As an example of a utilization of the present invention, a cobalt alloy powder consisting essentially of 17% chromium, 12.5% aluminum, 23% cobalt, 0.45% yttrium and balance nickel is sprayed with the above described powder spray apparatus onto gas aircraft turbine engines parts to a thickness of 0.1 mm to 3 mm. Similar nickel and nickel cobalt alloys may also be sprayed. The coatings, although not quite of the same quality, are expected to be sufficiently dense and free of oxidation to satisfactorily replace plasma spraying of such parts in a low pressure chamber. However, the coating is effected at substantially lower cost and freedom from the problems of chamber spraying.

The spray stream will have a stream gas flow out of the inner gas cap at a rate equal to the total of the flow rates of combustion products, any excess of uncombusted oxygen or fuel gas, and the carrier gas, and will be entraining the first annular flow. For example with the above presented preferable gas parameters, a stream gas flow rate of 354 l/min (750 scfh) is effected. Generally the first envelope flow should have a combustion gas flow rate of at least about 10% of the stream gas flow rate. Also, the second envelope flow should have an inert gas flow rate of at least about 80% of the stream gas flow rate. Further, the inert gas flow rate should be between about 25% and 135% of the combustion gas flow rate.

For wire gun spraying, FIG. 6, thermal spray gun 210 has a gas head 212 with a gas cap 214 mounted thereon, and a valve arrangement 216 for fuel, oxygen and air. The valve arrangement has a hose connection 218 for a fuel gas. Two other hose connections (not shown) for oxygen and air are spaced laterally from connector 218, above and below the plane of FIG. 6. The three connections are connected respectively by hoses from a fuel source 220, oxygen source 222 and air source 224. A cylindrical valve 226 controls the flow of the respective gases from their connections into the gun.

A cylindrical siphon plug 228 is fitted in a corresponding bore in the gas head, and a plurality of O-rings 230 thereon maintain a gas-tight seal. The siphon plug is provided with a central passage 232, and with an annular groove 234 and a further annular groove 236 with a plurality of inter-connecting passages 238 (two shown). With cylinder valve 226 in the open position, as shown, oxygen is passed by means of a hose 240 through its connection (not shown) and valve 226 into a passage 242 (partially shown) from whence it flows into groove 234 and through passage 238.

A substantially identical arrangement is provided to pass fuel gas from source 220 and a hose 246 through connection 218, valve 226 and a passage 248 into groove 236, mix with the oxygen, and pass as a combustible mixture through passages 250 aligned with passages 238 into an annular groove 252. Annular groove 252 aligns with a corresponding annular groove on the rear surface of a nozzle member 254 which is provided with an annular orifice or preferably a ring of equidistantly spaced burner orifices 256 exiting at a circular location on the face 258 of the nozzle coaxial with gas cap 214. The combustible mixture from the aligned grooves 252 passes through orifices 256 to produce an annular flow and is ignited at face 258 of nozzle 254. A nozzle nut 260 holds nozzle 254 and siphon plug 228 on gas head 212. Two further O-rings 261 are seated conventionally between the nozzle and the siphon plug for gas tight seals.

Nozzle member 254 is also provided with an axial bore 262 extending forwardly as a continuation of passage 232, for a spray wire 263 which is fed from the rear of gun 210. Burner nozzle 254 protrudes into gas cap 214 which is held in place by means of a retainer ring 264 and extends forwardly from the nozzle.

An inert gas such as nitrogen is passed from source 224 and hose 265 through its connection (not shown), cylinder valve 226, and a passage 266 (partially shown) to a space 268 in the interior of retainer ring 264. Lateral openings 270 in nozzle nut 260 communicate space 268 with a cylindrical combustion chamber 282 in gas cap 214 so that the gas may flow as an outer sheath from space 268 through these lateral openings 270, thence through an annular slot 284 between the outer surface of nozzle 254 and an inwardly facing cylindrical wall 86 defining combustion chamber 282, through chamber 282 as an annular outer flow, and out of the open end 288 in gas cap 214. Chamber 282 is bounded at its opposite, inner end by face 258 of nozzle 254. An annular space 300 between wire 263 and the outer wall of central passage 232 provides for an annular inner sheath flow of inert gas about the wire extending from the nozzle. This inner sheath of gas prevents backflow of hot gas along the wire and contributes significantly to reducing any tendency of buildup of spray material on wall 286. The sheath gas is conveniently tapped from the gas supplied to space 268, via a duct 302 to an annular groove 304 in the rear portion of siphon plug 228 and at least one orifice 306 into annular space 300 between wire 263 and siphon plug 228. Preferably at least three such orifices 306 are equally spaced arcuately to provide sufficient gas and to minimize vortex flow which could detrimentally swirl spray material outwardly to wall 286 of chamber 282. A bushing 307 rearward of the siphon plug closely surrounds the wire to minimize back leakage of gas. The inner sheath gas flow preferably should be between about 10% and 20% of the outer sheath flow rate, for example about 15%. The inner sheath may alternatively be regulated independently of the outer sheath gas, for better control.

A rear body 294 contains drive mechanism for wire 263. A conventional electric motor or air turbine (not shown) drives a pair of rollers 295 which have a geared connector mechanism 296 and engage the wire. A handle 298 or machine mounting device may be attached to the rear body.

As an example of a thermal spray gun incorporating the present invention, a Metco Type 12E wire gun sold by The Perkin-Elmer Corporation, Westbury, N.Y. is used with an EC gas cap, or alternatively a J gas cap, and a propane nozzle. The gas cap is adapted to a gas cap assembly 310 described below. The wire gun may be operated conventionally. Alternatively, in a preferred embodiment, the gun is further modified to spray at supersonic velocity. To effect this, a No. 5 siphon plug is modified by opening oxygen passage 238 to 1.5 mm to allow increased oxygen flow, and the bleed orifices 306 are opened to 1.0 mm to provide increased inner air flow. The nozzle has 10 holes each 0.89 mm in diameter on a 5.6 mm diameter circle for inlet of the combustible mixture into the combustion chamber In this gas head the annular air slot 284 between nozzle 254 and gas cap 214 is 0.5 mm wide, central bore 262 is 3.3 mm diameter for 3.175 mm wire. The open end 288 of the gas cap is 6.4 mm from the face of the nozzle.

Figure 7:
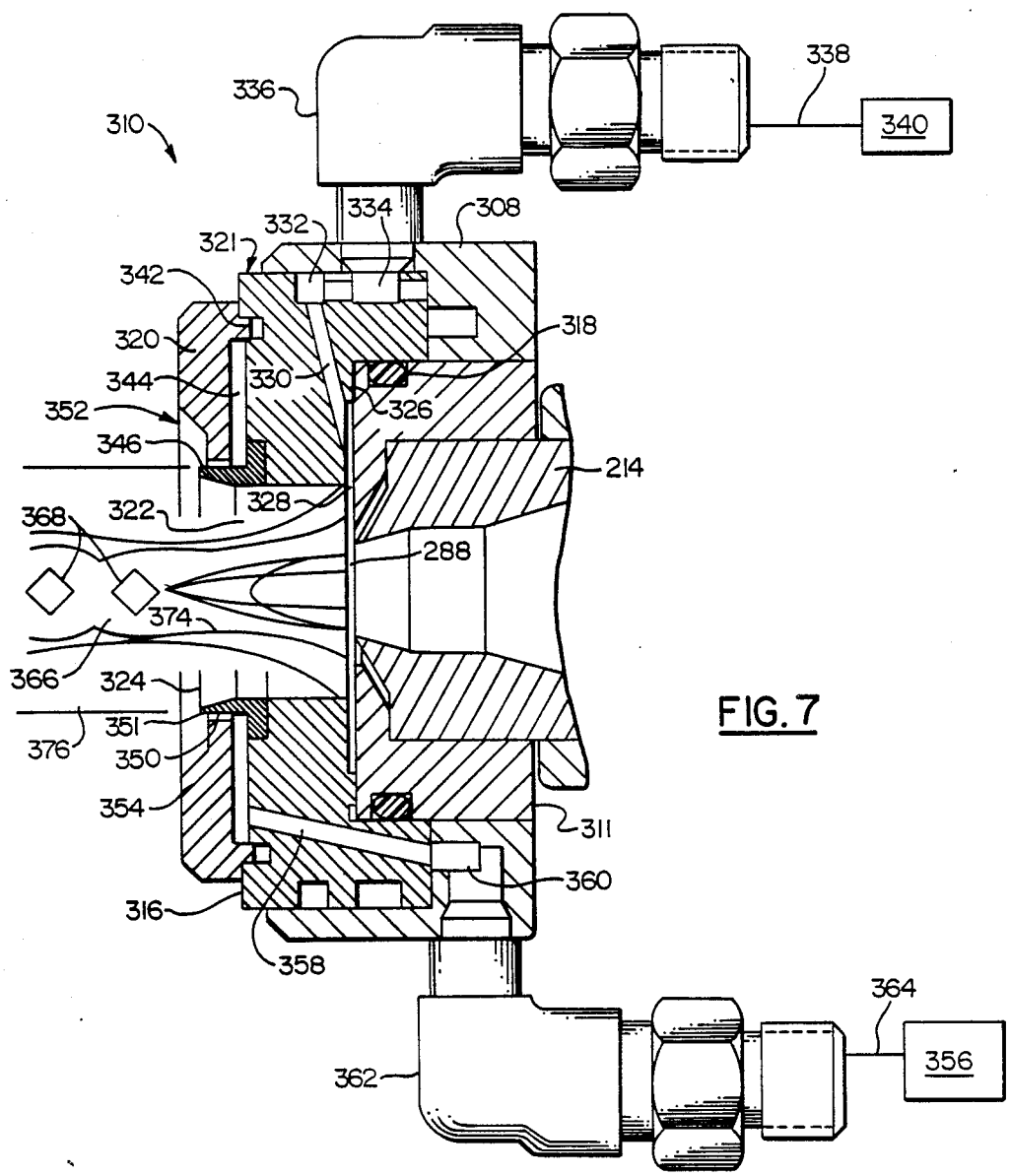
FIG. 7 is an enlargement of the forward end of the section of FIG. 6.

Mounted on gas cap 214 and forwardly therefrom is a further gas cap assembly 310 for providing additional flows surrounding the spray stream and its first envelope flow. In the present example of FIG. 6 and detailed in FIG. 7, this assembly includes an intermediate member 312, forming a second gas cap, and a clamping ring 308. For convenient construction the second gas cap is formed of four components retained and sealed together conventionally by brazing, screws, O-rings or the like (for clarity not shown). However the cap and the clamping ring more generally may have any practical construction and attachment to first gas cap 214 and/or the rest of the gun.

A further component of assembly 310 is an adaptor ring 311 that slips over first gas cap 214 and effectively forms a portion of the first gas cap; thus alternatively ring 311 and cap 214 may be formed of one piece. In the present example the ring is held on cap 214 by clamping ring 308 which, with the adaptor ring, may have a slit with a clamping screw (not shown). A cylindrical intermediate member 316 fits forwardly over the adaptor ring and is sealed thereto with an O-ring 318. A washer shaped forward member 320 is attached to the intermediate member.

The intermediate member and an insert 346 therein cooperate to form a second cap 321 with a central forward chamber 322 in the second gas cap. Chamber 322 should have an inside diameter between about one and three times the diameter of open end 288 of the first gas cap, and between about one and two times the inner length of forward chamber 322. The forward chamber has a forwardly facing exit opening 324.

Intermediate member 316 is spaced from the adaptor ring 311 by means of a first flange 326, sufficiently to form a thin annular aperture 328, e.g. 0.4 mm thick. This aperture receives a combustion gas such as propane via a first passage 330 in the intermediate member, interconnected first and second outer grooves 332, 334, a first gas connector 336 mounted on clamping ring 308 and a hose 338 from a source 340 of pressurized combustion gas. Aperture 328 opens radially into chamber 322 adjacent open end 288.

Forward member 320 is similarly spaced from intermediate member 316 with a second connecting flange 342 to form a channeling groove 344. Annular insert 346 is affixed forwardly within the intermediate member with a space to provide an annular aperture 350 with a terminal 351 opening in the forward face 352 of the second air cap 321 adjacent exit opening 324. Aperture 350 communicates with groove 344. Coaxial aperture 350 is, e.g., 0.3 mm thick. Preferably forward member 320 has a dished face 354 from which insert 346 protrudes slightly. Connecting groove 344 receives an inert gas such as nitrogen, argon or helium from a pressurized gas source 356 via a second passage 358 in the intermediate member, a third outer groove 360, a second gas connector 362 and a hose 364. It will be appreciated that the forward gas cap may be more integral with the gun body so that further channeling in the gun may displace gas connectors 336, 362 to the rear of the gun, or the gases to the second cap may be tapped from flows to the first gas cap.

The gas flow means of annular aperture 328 provide for a combustion gas envelope 374 extending as a second annular combustion flow surrounding supersonic spray stream 366 forwardly from open end 288. Similarly the gas flow means of annular aperture 350 provide an inert gas envelope 376 extending as a second annular inert gas flow surrounding the second combustion flow 374 outside the inner supersonic stream, forwardly of the open end.

The wire or rod should have conventional sizes and accuracy tolerances for thermal spray wires and thus, for example may vary in size between 6.4 mm and 2.3 mm (20 gauge). The wire or rod may be formed conventionally as by drawing, or may be formed by sintering together a powder, or by bonding together the powder by means of an organic binder or other suitable binder which disintegrates in the heat of the heating zone, thereby releasing the powder to be sprayed in finely divided form.

A supply of each of the gases to the cylindrical combustion chamber is provided at a sufficiently high pressure, e.g. at least two atmospheres above ambient atmospheric in the chamber, and is ignited conventionally such as with a spark device, such that the mixture of combusted gases and air will issue from the open end as a supersonic flow entraining the powder. The heat of the combustion will melt the wire tip and the pressure and velocity of the gases atomize the molten metal and propel the same at high velocity such as to deposit a coating onto a substrate. Shock diamonds should be observable particularly without wire in the gun. Because of the annular flow configuration, an expansion type of nozzle exit is not necessary to achieve the supersonic flow.

According to the supersonic embodiment of the present invention, the wire speed is adjusted so that wire tip 299 is located proximate open end 288, as distinct from being beyond the air cap by a distance about equal to the diameter of the opening in a conventional wire gun operation. The oxygen and combustion gas flows should be relatively high in proportion to the flow rate of the outer sheath of gas flow through slot 284, compared to a conventional wire gun. The reason is that the atomizing role is taken over by the high velocity, supersonic flow of combustion products through open end 288. Atomization in this mode is best effected with wire tip 299 located proximate the plane of opening 288, preferably within 25% of the opening diameter.

Using oxygen flow as a measure of the flow of combustion products, the flow rate of oxygen should be at least about 80% of the outer sheath gas flow and preferably between 90% and 100%. For example an oxygen flow rate of 340 l/min and an outer gas flow of 357 l/min corresponds to the oxygen being 95% of the gas, and compares with a conventional wire gun being operated conventionally with MPS gas and oxygen at 83 l/min and 623 l/min gas, i.e., 14%, oxygen compared to the outer gas (generally air in an ordinary wire gun). The passages for oxygen should be of such cross sectional area and length as to allow the appropriate flow, in mixture with the combustion gas, into the combustion chamber at least two and preferably three atmospheres. The outer gas sheath should similarly be such as to allow the proper flow relative to oxygen; conventional wire gun flows are also suitable for non-supersonic spray. The combustion gas is generally close to stoichiometric relative to the oxygen.

Two preferable combustion gases for the present invention are propylene gas and methylacetylene-propadiene gas ("MPS"). Each of these gases allows a relatively high velocity spray stream and excellent coatings to be achieved without backfire. For example with a propylene or MPS pressure of about 7 kg/cm$^2$ (100 psig) gauge (above atmospheric pressure) to the gun, oxygen at 10.5 kg/cm$^2$ (150 psig) and air at 5.6 kg/cm$^2$ (80 psig), at least 8 visible shock diamonds are readily visible in the spray stream without wire feed. Spray distance should be about 13 cm for "hard" wires (steel, bronze, molybdenum and the like) and 20-30 cm for "soft" wires (zinc, aluminum and the like).

Generally the envelope flows are similar to those described for the powder spraying. Preferable flow rate for the combustion gas envelope is between about 38 and 94 l/min, e.g. 66 l/min, and for the inert gas envelope is between about 94 and 472 l/min, e.g. 354 l/min. The outer inert envelope generally shields the spray stream, and the inner, combustion gas envelope gets oxygen from the air that penetrates the outer envelope. Generally the first envelope flow should have a combustion gas flow rate of at least about 10% of the stream gas flow rate. Also, the second envelope flow should have an inert gas flow rate of at least about 80% of the stream gas flow rate. Further, the inert gas flow rate should be between about 25% and 135% of the combustion gas flow rate.

As an example of a utilization of the present invention, a nickel alloy wire consisting essentially of 17% chromium, balance nickel is sprayed with the above described powder spray apparatus onto gas aircraft turbine engines parts to a thickness of 0.1 mm to 3 mm. Similar nickel and nickel-cobalt alloys may also be sprayed. The coatings, although not quite of the same quality, are expected to be sufficiently dense and free of oxidation to satisfactorily replace plasma spraying of such parts in a low pressure chamber. However, the coating is effected at substantially lower cost and freedom from the problems of chamber spraying.

The spray stream will have a stream gas flow out of the inner gas cap at a standardized rate equal to the total of the flow rates of combustion products, any excess of uncombusted oxygen or fuel gas, and the carrier gas, and will be entraining the first annular flow. For example with the above-presented preferable gas parameters, a stream gas flow rate of 354 l/min is effected.

Potential applications for coatings produced with the apparatus and method of the present invention are particularly in gas turbine engines. Such applications include alloy bond coats for ceramics in combustion sections and for abradable seals coatings; blade platforms (tips) that contact the seals; blade roots; and thin coatings for airfoils.

While the invention has been described above in detail with reference to specific embodiments, various changes and modifications which fall within the spirit of the invention and scope of the appended claims will become apparent to those skilled in this art. The invention is therefore only intended to be limited by the appended claims or their equivalents.

What is claimed is:

1. A thermal spray gun useful for spraying a low-oxide coating of oxidizable material, comprising combustion gun means for generating a supersonic spray stream of combustion products and heat fusible material in finely divided form, sheath gas means for directing a first envelope flow of inert gas adjacently surrounding the spray stream, combustion envelope means for directing a second envelope flow of combustion gas adjacently surrounding the first envelope flow, and inert envelope means for directing a third envelope flow of inert gas adjacently surrounding the second envelope flow.

2. A powder thermal spray gun useful for spraying a low oxide coating of oxidizable material, comprising:
   a nozzle member with a nozzle face;
   a first gas cap extending from the nozzle member and having an inwardly facing cylindrical wall defining a combustion chamber with an open end for propelling combustion products into the ambient atmosphere at supersonic velocity and an opposite end bounded by the nozzle face;
   combustible gas means for injecting an annular combustible flow of a combustible mixture of a combustible gas and oxygen from the nozzle member coaxially into the combustion chamber at a pressure therein sufficient to propel combustion products of the mixture from the open end at supersonic velocity;
   sheath gas means for injecting a first annular flow of inert gas adjacent to the cylindrical wall radially outward of the annular combustible flow;
   feeding means for feeding heat fusible thermal spray powder from the nozzle member into the combustion chamber radially inward of the combustible mixture, whereby a supersonic spray stream containing the heat fusible powder is propelled through the open end;
   combustion envelope means for directing a second annular flow of combustion gas adjacently surrounding the first annular flow forwardly from the open end; and
   inert envelope means for directing a third annular flow of inert gas adjacently surrounding the second annular flow forwardly of the open end.

3. A thermal spray gun according to claim 2 further comprising a second gas cap extending forwardly from the first gas cap and having an inside diameter greater than the open end, and wherein the combustion envelope means comprises first annular aperture means for introducing the second annular flow into the second gas cap adjacent the open end, and the inert envelope means comprises second annular aperture means for introducing the third annular inert flow forwardly of the first annular aperture means.

4. A thermal spray gun according to claim 3 wherein the second gas cap has a forward face with an exit opening therein, and the second annular flow is introduced from the forward face adjacent the exit opening.

5. A thermal spray gun according to claim 4 wherein the second annular flow is introduced in a substantially radially inward direction, and the third annular flow is introduced in a substantially forward direction.

6. A thermal spray gun according to claim 5 wherein the first annular aperture means comprises the second gas cap cooperating with the first gas cap to form an annular radial aperture receptive of the combustion gas and opening into the second gas cap.

7. A thermal spray gun according to claim 6 wherein the second aperture means comprises the second gas cap having an annular coaxial aperture in the forward face adjacent the exit opening, the coaxial aperture being receptive of the inert gas and having a terminal end opening at the forward face.

8. A thermal spray gun according to claim 4 wherein the second gas cap has an inside diameter and further has an inner length defined by the distance between the open end and the exit opening, with the inside diameter being between about one and two times the inner length.

9. A thermal spray gun according to claim 8 wherein the open end has an opening diameter and the inside diameter is between about one and three times the opening diameter.

10. A thermal spray gun according to claim 9 wherein a chamber length is defined by a shortest distance from the nozzle face to the open end, and the chamber length is between about one and two times the opening diameter.

11. A thermal spray gun according to claim 2 wherein a chamber length is defined by a shortest distance from the nozzle face to the open end and the open end has an opening diameter, with the chamber length being between about one and two times the opening diameter.

12. A thermal spray gun according to claim 2 further comprising inner gas means for injecting an annular inner flow of pressurized gas from the nozzle member into the combustion chamber coaxially between the combustible mixture and the powder carrier gas.

13. A thermal spray gun according to claim 12 wherein the nozzle member comprises a tubular outer portion defining an outer orifice means for injecting the annular flow of the combustion mixture into the combustion chamber, and a tubular inner portion having therein an inner orifice means for injecting the annular inner flow into the combustion chamber and a powder orifice means for feeding the powder-carrier gas into the combustion chamber, and wherein the inner portion protrudes into the combustion chamber forwardly of the outer portion.

14. A thermal spray gun according to claim 13 wherein a chamber length is defined by a shortest distance from the nozzle face to the open end, and the inner portion protrudes by a distance between about 10% and 40% of the chamber length.

15. A thermal spray gun according to claim 14 wherein the outer annular orifice means includes an annular opening into the combustion chamber with a radially inward side bounded by an outer wall of the inner portion, the outer wall extending forwardly from the annular opening with a curvature toward the axis.

16. A thermal spray gun according to claim 15 wherein the curvature is such as to define a generally hemispherical nozzle face on the inner portion.

17. A thermal spray gun according to claim 13 wherein the outer gas means includes the nozzle member and a rearward portion of the cylindrical wall defining a forwardly converging slot therebetween exiting into the combustion chamber.

18. A thermal spray gun according to claim 13 wherein the combustion chamber converges forwardly at an angle with the axis less than a corresponding angle of the converging annular slot.

19. A thermal spray gun according to claim 13 wherein the powder orifice means comprises the nozzle member having an axial bore therein.

20. A thermal spray gun according to claim 2 wherein the combustible gas means is disposed so as to inject the combustible mixture into the combustion chamber from a circular location on the nozzle face, the circular location having a diameter approximately equal to the diameter of the open end.

21. A thermal spray gun according to claim 20 wherein the open end is spaced axially from the nozzle face by a shortest distance of between approximately one and two times the diameter of the circular location.

22. A wire thermal spray gun useful for spraying a low oxide coating of oxidizable material, comprising:
a nozzle member with a nozzle face;
a first gas cap extending from the nozzle member and having an inwardly facing cylindrical wall defining a combustion chamber with an open end for propelling combustion products into the ambient atmosphere and an opposite end bounded by the nozzle face;
combustible gas means for injecting an annular combustible flow of a combustible mixture of a combustible gas and oxygen from the nozzle member coaxially into the combustion chamber for combustion so as to propel combustion products of the mixture from the open end;
sheath gas means for injecting a first annular flow of inert gas adjacent to the cylindrical wall radially outward of the annular combustible flow;
feeding means for feeding a heat fusible thermal spray wire axially through the nozzle member into the combustion chamber radially inward of the combustible mixture to a point where a wire tip is formed, whereby a spray stream containing the heat fusible material in finely divided form is propelled away from the open end by the combustion products and the first annular flow;
combustion envelope means for directing a second annular flow of combustion gas adjacently surrounding the first annular flow forwardly from the open end; and
inert envelope means for directing a third annular flow of inert gas adjacently surrounding the second annular flow forwardly of the open end.

23. A thermal spray gun according to claim 22 further comprising a second gas cap extending forwardly from the first gas cap and having an inside diameter greater than the open end, and wherein the combustion envelope means comprises first annular aperture means for introducing the second annular flow into the second gas cap adjacent the open end, and the inert envelope means comprises second annular aperture means for introducing the third annular inert flow forwardly of the first annular aperture means.

24. A thermal spray gun according to claim 23 wherein the second gas cap has a forward face with an exit opening therein, and the second annular flow is introduced from the forward face adjacent the exit opening.

25. A thermal spray gun according to claim 24 wherein the second annular flow is introduced in a substantially radially inward direction, and the third annular flow is introduced in a substantially forward direction.

26. A thermal spray gun according to claim 25 wherein the first annular aperture means comprises the second gas cap cooperating with the first gas cap to form an annular radial aperture receptive of the combustion gas and opening into the second gas cap.

27. A thermal spray gun according to claim 26 wherein the second aperture means comprises the second gas cap having an annular coaxial aperture in the forward face adjacent the exit opening, the coaxial aperture being receptive of the inert gas and having a terminal end opening at the forward face.

28. A thermal spray gun according to claim 22 further comprising inner gas means for injecting an annular inner flow of pressurized gas from the nozzle member into the combustion chamber coaxially adjacent to the wire.

29. A method for producing a low oxide coating of oxidizable material, comprising generating a supersonic spray stream of combustion products and heat fusible material in finely divided form, directing a first envelope flow of inert gas adjacently surrounding the spray stream, combustion envelope means for directing a second envelope flow of combustion gas adjacently surrounding the first envelope flow, directing a third envelope flow of inert gas adjacently surrounding the second envelope flow, and directing the spray stream toward a substrate such as to produce a coating thereon.

30. A method for producing a low oxide coating of oxidizable material with a powder thermal spray gun including a nozzle member with a nozzle face, a first gas cap extending from the nozzle member and having an inwardly facing cylindrical wall defining a combustion chamber with an open end for propelling combustion products into the ambient atmosphere at supersonic velocity and an opposite end bounded by the nozzle face, the method comprising:
  injecting an annular combustible flow of a combustible mixture of a combustible gas and oxygen from the nozzle member coaxially into the combustion chamber at a pressure therein sufficient to propel combustion products of the mixture from the open end at supersonic velocity;
  injecting a first annular flow of inert gas adjacent to the cylindrical wall radially outward of the annular combustible flow;
  feeding heat fusible thermal spray powder from the nozzle member into the combustion chamber radially inward of the combustible mixture, whereby a supersonic spray stream containing the heat fusible powder is propelled through the open end;
  directing a second annular flow of combustion gas adjacently surrounding the first annular flow forwardly from the open end;
  directing a third annular flow of inert gas adjacently surrounding the second annular flow forwardly of the open end; and directing the spray stream toward a substrate such as to produce a coating thereon.

31. A method according to claim 30 wherein the thermal spray gun includes a second gas cap extending forwardly from the first gas cap and having an inside diameter greater than the open end, and wherein the method further comprises introducing the second annular flow into the second gas cap adjacent to open end, and introducing the third annular inert flow forwardly of the introduction of the second annular flow.

32. A method according to claim 31 wherein the second gas cap has a forward face with an exit opening therein, and the method further comprises introducing the second annular flow from the forward face adjacent to the exit opening.

33. A method according to claim 32 wherein the second annular flow is introduced in a substantially radially inward direction, and the third annular flow is introduced in a substantially forward direction.

34. A method according to claim 33 wherein the combustible mixture is injected at a sufficient pressure into the combustion chamber to propel the spray stream at supersonic velocity.

35. A method according to claim 30 wherein the combustible mixture is injected at a sufficient pressure into the combustion chamber to produce at least 8 visible shock diamonds in the spray stream in the absence of powder-carrier gas feeding.

36. A method according to claim 30 wherein the combustible mixture is injected at a pressure of at least two atmospheres above ambient atmospheric pressure.

37. A method according to claim 30 wherein the spray stream has a stream gas flow rate, and the first envelope flow has a combustion gas flow of at least about 10% of the stream gas flow rate.

38. A method according to claim 30 wherein the spray stream gas flow rate, and the second envelope flow has an inert gas flow rate of at least about 80% of the stream gas flow rate.

39. A method according to claim 30 wherein the first envelope flow has a combustion gas flow rate, and the second envelope flow has an inert gas flow rate between about 25% and 135% of the combustion gas flow rate.

40. A method for producing a low oxide coating of oxidizable material with a wire thermal spray gun including a nozzle member with a nozzle face, a first gas cap extending from the nozzle member and having an inwardly facing cylindrical wall defining a combustion chamber with an open end for propelling combustion products into the ambient atmosphere and an opposite end bounded by the nozzle face, the method comprising:
  injecting an annular combustible flow of a combustible mixture of a combustible gas and oxygen from the nozzle member coaxially into the combustion chamber and combusting the mixture at a pressure therein sufficient to propel combustion products of the mixture from the open end;
  injecting a first annular flow of inert gas adjacent to the cylindrical wall radially outward of the annular combustible flow;
  feeding a heat fusible thermal spray wire through the nozzle member into the combustion chamber radially inward of the combustible mixture, whereby a spray stream containing the heat fusible material in finely divided form is propelled from the wire;
  directing a second annular flow of combustion gas adjacently surrounding the first annular flow forwardly from the open end;
  directing a third annular flow of inert gas adjacently surrounding the second annular flow forwardly of the open end; and directing the spray stream toward a substrate such as to produce a coating thereon.

41. A method according to claim 40 wherein the thermal spray gun includes a second gas cap extending forwardly from the first gas cap and having an inside diameter greater than the open end, and wherein the method further comprises introducing the second annular flow into the second gas cap adjacent to open end, and introducing the third annular inert flow forwardly of the introduction of the second annular flow.

42. A method according to claim 41 wherein the second gas cap has a forward face with an exit opening therein, and the method further comprises introducing the second annular flow from the forward face adjacent to the exit opening.

43. A method according to claim 42 wherein the second annular flow is introduced in a substantially radially inward direction, and the third annular flow is introduced in a substantially forward direction.

44. A method according to claim 40 wherein the spray stream gas flow rate, and the second envelope flow has an inert gas flow rate of at least about 80% of the stream gas flow rate.

45. A method according to claim 40 wherein the combustible mixture is injected at a sufficient pressure into the combustion chamber to propel the spray stream at supersonic velocity.

46. A method according to claim 45 wherein the combustible mixture is injected at a sufficient pressure into the combustion chamber to produce at least 8 visible shock diamonds in the spray stream in the absence of powder-carrier gas feeding absence of wire feed.

47. A method according to claim 45 wherein the combustible mixture is injected at a pressure of at least two atmospheres above ambient atmospheric pressure.

48. A method according to claim 45 wherein the spray stream has a stream gas flow rate, and the first envelope flow has a combustion gas flow of at least about 10% of the stream gas flow rate.

49. A method according to claim 45 wherein the spray stream gas flow rate, and the second envelope flow has an inert gas flow rate of at least about 80% of the stream gas flow rate.

50. A method according to claim 40 wherein the first envelope flow has a combustion gas flow rate, and the second envelope flow has an inert gas flow rate between about 25% and 135% of the combustion gas flow rate.

* * * * *

UNITED STATES PATENT OFFICE
CERTIFICATE OF CORRECTION

Patent No. 4,964,568                    Dated October 23, 1990

Inventor(s)  Anthony J. Rotolico et al

It is certified that error appears in the above-identified patent and that said Letters Patent is corrected as shown below:

On the title page item [75] should read as follows:

Inventors: -- Anthony J. Rotolico, Hauppauge;

Janusz R. Wlodarczyk, Jackson Heights;

both of New York.

Signed and Sealed this

Thirty-first Day of March, 1992

*Attest:*

HARRY F. MANBECK, JR.

*Attesting Officer*           *Commissioner of Patents and Trademarks*